US011360320B2

United States Patent
Schultz (10) Patent No.: US 11,360,320 B2
(45) Date of Patent: Jun. 14, 2022

(54) HEXAHEDRAL POLARIZING BEAMSPLITTER

(71) Applicant: Vuzix Corporation, West Henrietta, NY (US)

(72) Inventor: Robert J. Schultz, Victor, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 16/635,378

(22) PCT Filed: Jul. 31, 2018

(86) PCT No.: PCT/US2018/044700
§ 371 (c)(1),
(2) Date: Jan. 30, 2020

(87) PCT Pub. No.: WO2019/028078
PCT Pub. Date: Feb. 7, 2019

(65) Prior Publication Data
US 2021/0088801 A1   Mar. 25, 2021

Related U.S. Application Data

(60) Provisional application No. 62/539,617, filed on Aug. 1, 2017.

(51) Int. Cl.
*G02B 27/28* (2006.01)
(52) U.S. Cl.
CPC .................. *G02B 27/285* (2013.01)
(58) Field of Classification Search
None
See application file for complete search history.

(56) References Cited

U.S. PATENT DOCUMENTS

| 5,097,323 | A | 3/1992 | Sato et al. |
| 5,245,472 | A * | 9/1993 | Hegg ................... G02B 27/283 |
| | | | 359/488.01 |
| 6,411,449 | B1 | 6/2002 | Hashizume et al. |
| 7,196,849 | B2 | 3/2007 | McGuire, Jr. et al. |
| | | | (Continued) |

FOREIGN PATENT DOCUMENTS

| WO | WO-2012104839 A1 * | 8/2012 | ........... G02B 5/3058 |
| WO | 2013016163 A2 | 1/2013 | |

OTHER PUBLICATIONS

U.S. Patent and Trademark Office (ISA/US), International Search Report and Written Opinion from International Application No. PCT/US2018/044700, dated Oct. 23, 2018.

*Primary Examiner* — Derek S. Chapel
(74) *Attorney, Agent, or Firm* — Harter Secrest & Emery LLP; Thomas B. Ryan; Jacob D. Merrill, Esq.

(57) ABSTRACT

A hexahedral polarization beamsplitter is constructed with four substantially triangular prisms with a polarizing beamsplitter located within each of the interfaces between the assembled prisms. An input side of the assembly receives an unpolarized beam and two opposing output sides of the assembly transmit orthogonally polarized portions of the unpolarized beam in opposite directions. The polarizing beamsplitters are arranged at the interfaces so that each of the orthogonally polarized portions of the unpolarized beam is both reflected by one of the polarizing beamsplitters and transmitted by another of the polarizing beamsplitters.

11 Claims, 5 Drawing Sheets

(56) References Cited

U.S. PATENT DOCUMENTS

| | | | |
|---|---|---|---|
| 2003/0223670 A1 | 12/2003 | Nikolov et al. | |
| 2006/0215117 A1* | 9/2006 | Aastuen | H04N 9/315 353/20 |
| 2014/0176818 A1* | 6/2014 | Watson | G02B 27/283 349/9 |
| 2017/0068103 A1* | 3/2017 | Huang | G02B 27/283 |

* cited by examiner

HEXAHEDRAL POLARIZING BEAMSPLITTER

TECHNICAL FIELD

This invention generally relates to polarizing beamsplitters and more particularly relates to hexahedral polarizing beamsplitters to separate an unpolarized light beam source into orthogonal polarization component beams.

BACKGROUND

A collimated light beam can be regarded as a bundle of light rays each propagating in a common direction. Under the classic wave model, the rays are considered electromagnetic waves with oscillating electric and magnetic fields in orthogonal planes that are perpendicular to each other and to the direction of wave propagation. The orthogonal planes within which the oscillations take place can be variously oriented about an instant axis extending in the direction of propagation.

Electromagnetic waves having no organized directionality to their electromagnetic oscillations are generally regarded as being in an unpolarized state. However, the electromagnetic oscillations can be organized at the light source or during subsequent propagation to produce light in various polarized states. In a homogeneous medium, the electric and magnetic fields oscillate synchronously in orthogonal planes, so the polarization state can be defined with reference to a time-varying vector representing just the electromagnetic field. The light becomes progressively more polarized as the variation in the orientation of the electric field vector becomes less random. As a time-varying vector normal to the direction of propagation, the electric field vector can be disassembled into two orthogonal components in fixed orientations but with oscillating magnitudes. As a phase difference (i.e., phase delay) between the two oscillating orthogonal components becomes more regular, the light becomes more polarized. For example, if the phase difference between the oscillating orthogonal components of the electric field vector remains at zero degrees or 180 degrees, the electric field vector oscillates in a single plane, which is referred to as linear polarization. The different amplitudes of the oscillating orthogonal components determine the orientation of the linear polarization with respect to the orthogonal component orientations. Circular polarization occurs at a constant phase difference of 90 degrees between oscillating components of equal amplitude, and elliptical polarization occurs at the remaining constant phase differences, as well as at a constant phase difference of 90 degrees between oscillating components of unequal non-zero amplitudes. Both positive and negative phase differences are possible between the orthogonal components of the electric field vector, which results in right-handed or left-handed circular or elliptical polarizations.

Various mechanisms are known for converting unpolarized or incompletely polarized light into a more polarized state, including reflection and refraction at optical interfaces. For example, a portion of an unpolarized light beam encountering an interface between two optical mediums at the so-called Brewster angle of incidence (i.e., the arctangent of the ratio of refractive indices between the optical mediums) reflects from the interface as a linearly polarized light beam. The remaining portion that is refracted through the interface retains a somewhat mixed polarization. Some materials, often in crystal form, exhibit various forms of anisotropy that can differentially absorb or refract different polarization states. Dichroic materials can differentially attenuate the amplitudes of different polarization states. Birefringent materials can differentially affect phase delays between different polarization states and can be used to change one polarization state to another or to physically separate different polarization states into different beams.

Polarizing beamsplitters split an unpolarized input light beam into two output beams with orthogonal polarization states. In many common polarizing beamsplitters, one of the two output beams may be more fully polarized than the other. The performance of the beamsplitters can also be sensitive to both the wavelength and the angle of incidence at which the unpolarized beam encounters the beamsplitter.

Thin film polarizing beamsplitters can be constructed from glass or polymer substrates on which a series of optical coatings are applied. Typically, the coatings are constructed with alternating one-quarter wavelength layers of differing refractive indices. The constructions can exploit both Brewster's angle reflections and interference effects to act as polarizing beamsplitters. The substrate for the film can either be a plate, which is inserted into the beam path at a particular angle, or a first right-angle prism that is cemented together with a second right-angle prism to form a cube or other rectangular cuboid shape with the thin film oriented along a diagonal. One example of this type of polarizing beamsplitter is a MacNeille cube. Cuboid and other hexahedral shapes are often used to allow light to enter and exit the beamsplitter normal to the exterior surfaces of the beamsplitter.

A Glan-Taylor prism beamsplitter also comprises two right-angle prisms typically made of a birefringent material such a calcite in which the prisms are assembled with an air gap along their mating diagonal faces. With respect to a plane that includes the incidence angle of the unpolarized beam, the Glan-Taylor prism reflects so called s-polarized light, whose electric field vector oscillates normal to the plane of incidence at the internal air-gap and transmits so-called p-polarized light, whose electric field vector oscillates in the plane of incidence. Typically, the transmitted component is more completely polarized than the reflected component.

A wire grid polarizing beamsplitter includes an array of thin metal lines/wires closely spaced on a transparent substrate. The width of the wires is generally comparable to their spacing and both are generally small in comparison the wavelength of the light beam intended to be split to increase efficiency and limit the effects of diffraction. The wire grid can be cemented between two right angle prisms in the form of a beamsplitting cube or other rectangular cuboid and oriented as desired on a mating diagonal surface. The wire grid tends to reflect a polarization component whose electric field vector oscillates in the direction of the wires and to transmit an orthogonal polarization component whose electric field vector oscillates in a direction perpendicular to the wires. Although wire grid polarizing beamsplitters can be optimized for different ranges of wavelengths and incidence angles, one or both output beams may be less polarized than desired.

The orthogonally polarized output beams of the various polarizing beamsplitters are generally output at either acute angles or right angles to each other depending upon their relative directions of transmission or reflection and often require some form or realignment or other relative orientation to optically exploit the different polarizations. Particular orientations such as the orthogonally polarized output beams being angularly separated by 180 degrees can be difficult to achieve without additional optics.

SUMMARY OF THE INVENTION

Among embodiments of the invention, a hexahedral polarization beamsplitter can be assembled from four substantially triangular prisms each having two triangular faces and two quadrilateral (e.g., trapezoidal, rectangular, or square) faces that intersect in pairs along parallel lines that extend to corresponding vertices of the triangular faces. Within the assembled hexahedral polarization beamsplitter, the two quadrilateral faces of each triangular prism form interfaces with the respective quadrilateral faces of two other triangular prisms forming four different interfaces. A polarizing beamsplitter is formed within each of the four interfaces. The polarizing beamsplitters can take a variety of forms, including thin film and wire grid polarizing beamsplitters. Different polarizing beamsplitters can be associated with each of the interfaces. However, the polarizing beamsplitters preferably operate in pairs so that unpolarized light that enters one of the sides of the hexahedral polarization beamsplitter exits from two opposing sides of the hexahedral polarization beamsplitter in orthogonal polarization states.

In addition to exiting the hexahedral polarization beamsplitter in opposite directions, each orthogonal polarization component preferably encounters two polarizing beamsplitters in succession, which significantly adds to the more complete separation of the orthogonal polarization components. For example, a first encounter of an unpolarized beam containing orthogonal polarization components with one of the polarizing beamsplitters transmits one of the polarization components and reflects the other polarization component and a second encounter of either of the transmitted and reflected portions with another of the polarizing beamsplitters reflects the one polarization components and transmits the other polarization component. Thus, each polarization component is both reflected once by a polarizing beamsplitter and transmitted once by another polarizing beamsplitter. The two orthogonal polarization components (e.g., an s-polarization component and a p-polarization component) are preferably reflected in opposite directions so that the two polarization components exit the hexahedral polarization beamsplitter from opposite sides. The two quadrilateral sides through which the oppositely polarized beams exit the hexahedral polarization beamsplitter are preferably oriented normal to the exiting beams to minimize refractive effects. For example, the two output sides can extend in parallel and an input side can be oriented orthogonal to the parallel output sides of the hexahedral polarization beamsplitter.

The output of the hexahedral polarization beamsplitter preferably includes two beams having essentially orthogonal linear polarization states and traveling in essentially parallel, but opposite directions. The beam path through the hexahedral polarization beamsplitter that results in an essentially s-polarized beam exiting from one side of the beamsplitter will be called the s-polarization channel. The beam path through the hexahedral polarization beamsplitter that results in an essentially p-polarized beam exiting from the opposite side of the hexahedral polarization beamsplitter will be called the p-polarization channel.

In this arrangement, the s- and p-polarization channels preferably exhibit bilateral symmetry, which provides additional system level advantages in certain optical systems where the output requires this symmetry. With such bilateral symmetry, the s- and p-polarization channels output from the hexahedral polarization beamsplitter can be relatively oriented through an angle of 180 degrees. In addition, the bilateral symmetry can also support equivalent optical path lengths for the two channels through the hexahedral polarization beamsplitter. For an imaging system with bilateral symmetry (such as a rectangular virtual image) maintaining such symmetry in either or both orientation and optical path length can be important.

The polarizing beamsplitters at the interfaces within the hexahedral polarization beamsplitter can be distinguished in a fundamental sense by the polarization component that is primarily reflected. Thus, a polarizing beamsplitter that primarily reflects the s-polarization component and primarily transmits the p-polarization component can be referred to as an s-polarization reflector. Similarly, a polarizing beamsplitter that primarily reflects the p-polarization component and primarily transmits the s-polarization component can be referred to as a p-polarization reflector. One embodiment features the s-polarization reflector as a thin film coating and the p-polarization reflector as a wire grid. Each polarization component is essentially twice filtered but just once reflected so that the orthogonal polarization components are each more completely polarized, and the orthogonal polarization components are output in opposite directions. Two polarizing beamsplitters in series, each having a limited ability to discriminate between orthogonal polarization states, can be more effective than any single polarizing beamsplitter having a greater ability to discriminate between orthogonal polarization states.

One version of such a hexahedral polarization beamsplitter includes four substantially triangular prisms assembled in the general form of a hexahedron. Two faces of each triangular prism form interfaces with the respective faces of two other triangular prisms forming a plurality of different interfaces. A polarizing beamsplitter is located within each of the interfaces.

The hexahedron assembly includes an input side for receiving an unpolarized beam and two opposing output sides through which orthogonally polarized portions of the unpolarized beam respectively exit the hexahedron assembly. The polarizing beamsplitters are arranged at the interfaces so that each of the orthogonally polarized portions of the unpolarized beam is both reflected by one of the polarizing beamsplitters and transmitted by another of the polarizing beamsplitters.

The orthogonally polarized portions of the unpolarized beam can be distinguished as an s-polarization component and a p-polarization component. The polarizing beamsplitters preferably include s-polarization reflectors that primarily reflect the s-polarization component and primarily transmit the p-polarization component and p-polarization reflectors that primarily reflect the p-polarization component and primarily transmit the s-polarization component. For example, at least one of the p-polarization reflectors can be a wire grid polarizing beamsplitter, and at least one of the s-polarization reflectors can be a thin film polarizing beamsplitter.

The polarization beamsplitters are preferably arranged so that the s-polarization component encounters both the s-polarization reflectors and the p-polarization reflectors en route between the input side and one of the opposing output sides of the hexahedron assembly, and the p-polarization component encounters both the s-polarization reflectors and the p-polarization reflectors en route between the input side and the other of the opposing output sides of the hexahedron assembly. An s-polarization channel can be defined by a beam path from the input side to the one opposing output side of the hexahedron assembly traversed by the s-polarization component resulting in an essentially s-polarized beam exiting from the one opposing output side of the hexahedron assembly. A p-polarization channel can be defined by a beam path from the input side to the other opposing output side of the hexahedron assembly traversed by the p-polarization component resulting in an essentially p-polarized beam exiting from the other opposing output side of the hexahedron assembly. Preferably, the s-polarization channel and the p-polarization channel have equivalent optical path lengths. In addition, the essentially s-polarized beam and the essentially p-polarized beam exiting the hexahedron assembly are preferably relatively oriented through a straight angle (i.e., approximately 180 degrees).

Each of the substantially triangular prisms preferably includes two triangular faces and two quadrilateral faces that intersect in pairs along parallel lines that extend to corresponding vertices of the triangular faces. The two quadrilateral faces of each triangular prism correspond to the two faces of each triangular prism that form the interfaces. At least three of the substantially triangular prisms preferably include a third quadrilateral face with the third quadrilateral face of a first of the three triangular prisms forming the input side of the hexahedron assembly, and the third quadrilateral faces of a second and a third of the three triangular prisms forming the two opposing output sides of the hexahedron assembly. The two opposing output faces of the hexahedron are preferably arranged in parallel. A fourth of the substantially triangular prisms preferably includes a face having a general form through which a remaining unpolarized portion of the unpolarized beam exits the hexahedron assembly.

These and other aspects, objects, features and advantages of the present invention will be more clearly understood and appreciated from a review of the following detailed description of the preferred embodiments and appended claims, and by reference to the accompanying drawings. The invention as

DETAILED DESCRIPTION OF THE INVENTION

The present description is directed to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

By "exemplary" is meant to be "an example of", not intended to suggest any preferred or ideal embodiment.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the terms "wavelength band" and "wavelength range" are equivalent and have their standard connotation as used by those skilled in the art of color imaging and refer to a continuous range of light wavelengths that are used to represent polychromatic images. Different wavelength bands are directed through different color channels, such as to provide red, green, and blue primary colors in conventional color imaging applications.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus.

In the context of the present disclosure, the term "passing" and "passing through" is intended to indicate optical ray transmission through an interface. Said interface may comprise a planar surface, a thin file, or structure deposed onto the interface through which an optical ray is transmitted.

Figure 1:
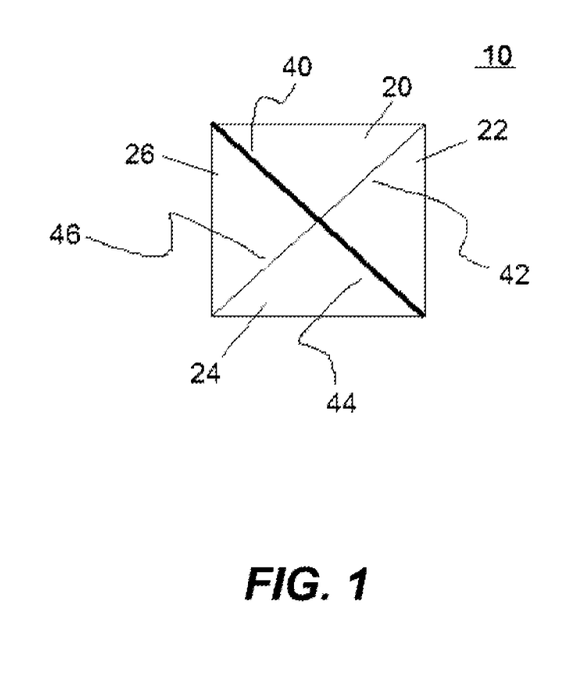
FIG. 1 is plan view of a schematic hexagonal polarization beamsplitter in a plane that includes the nominal orientations of an unpolarized input beam and two orthogonally polarized output beams.

In accordance with various embodiments of this invention, and as shown for example in FIG. 1, a composite polarization beamsplitter 10 is composed of four substantially triangular prisms 20, 22, 24, 26 assembled in the general form of a hexahedron. Two faces of each of the triangular prisms 20, 22, 24, 26 contribute to forming interfaces with the respective faces of two other of the triangular prisms forming four different interfaces. Polarizing beamsplitters 40, 42, 44, and 46 are located within the respective interfaces. The hexahedron can be in the form of a cube, rectangular cuboid, parallelepiped, trapezohedron, or other shape consistent with the intended input and outputs of the polarization beamsplitter. The polarizing beamsplitters 40, 42, 44, and 46 can be formed on either or between the mating faces of the triangular prisms 20, 22, 24, 26 that define the interfaces.

Each of the polarizing beamsplitters 40, 42, 44, and 46 reflects one orthogonal polarization component of an unpolarized beam and transmits another orthogonal polarization component of the unpolarized beam. However, the orthogonal polarization component reflected by one or more of the polarizing beamsplitters 40, 42, 44, and 46 is not the same as the orthogonal polarization component reflected by one or more other of the polarizing beamsplitters 40, 42, 44, and 46.

The orthogonal polarization components can be distinguished by convention as a p-polarization component and an s-polarization component. Generally, the p-polarization component corresponds to the electric field oscillations in a direction parallel to a plane of incidence, and the s-polarization component corresponds to of the electric field oscillations in a direction normal to the plane of incidence. Both directions are transverse to the direction of propagation.

Figure 2:
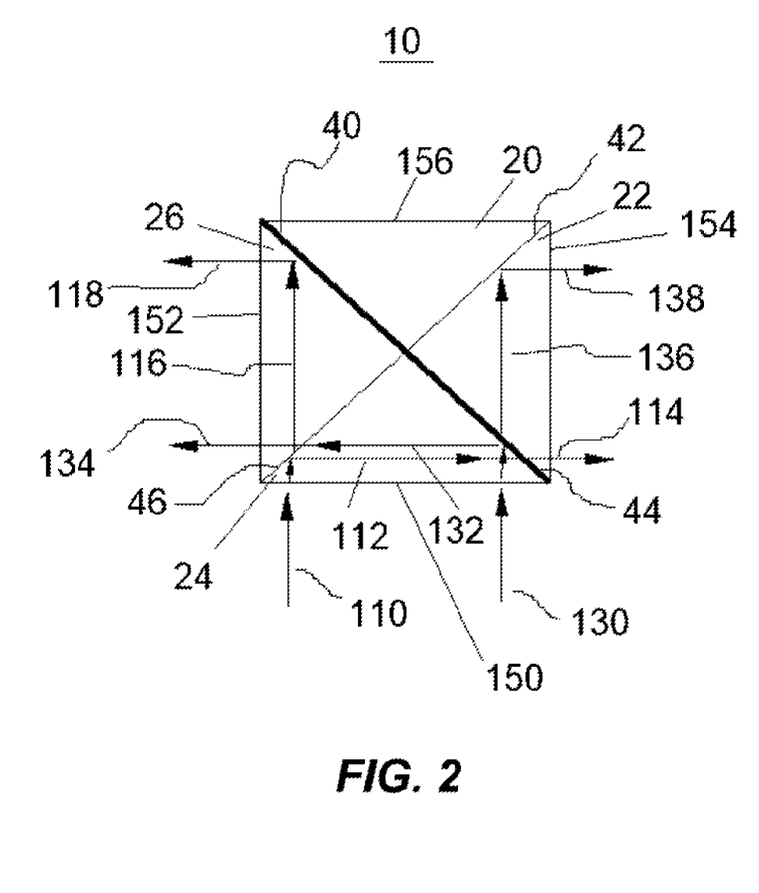
FIG. 2 is a similar plan view of the beamsplitter of FIG. 1 showing a multi-stage separation of the unpolarized input beam into the two orthogonally polarized output beams.
Figure 3A:
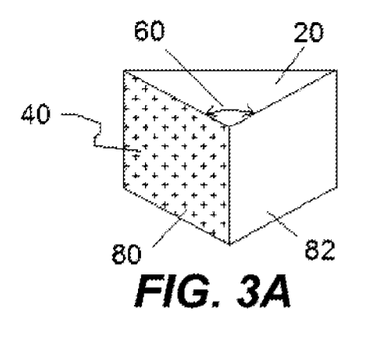
FIGS. 3A-3D are perspective views of four triangular prisms with respective polarizing beamsplitters on one of their respective faces, which can be assembled into the hexagonal polarization beamsplitter of FIG. 1.
Figure 3B:
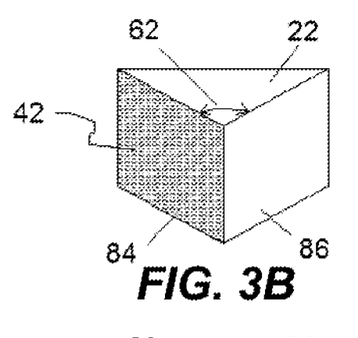
Figure 3C:
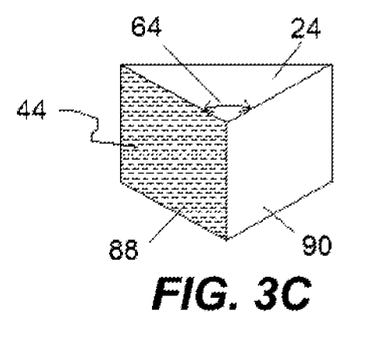
Figure 3D:
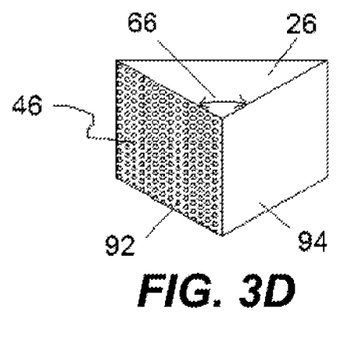

With reference to FIG. 2, an unpolarized input beam oriented at near normal incidence to an input side 150 of the polarization beamsplitter 10 is represented by rays 110 and 130. The unpolarized input ray 110 enters the triangular prism 24 and encounters the polarizing beamsplitter 46 through an incidence angle of approximately 45 degrees at which the input ray 110 is split into a reflected ray 112 composed primarily of one orthogonal polarization component and a transmitted ray 116 composed primarily of another orthogonal polarization component. For example, the reflected ray 112 can be composed primarily of an s-polarization component, and the transmitted ray 116 can be composed primarily of a p-polarization component. Thus, the polarizing beamsplitter 46 can be termed an s-polarization reflector that primarily reflects the s-polarization component and primarily transmits the p-polarization component.

The reflected ray 112 propagates in direction normal to the input beam across the triangular prism 24 into an encounter with the polarizing beamsplitter 44 through a similar incidence angle of approximately 45 degrees. However, unlike the polarizing beamsplitter 46, the polarizing beamsplitter 44 can be termed a p-polarization reflector that primarily reflects the p-polarization component and primarily transmits the s-polarization component. The reflected ray 112, which composed primarily of an s-polarization component, largely transmits through the polarizing beamsplitter 44 and exits through an output side 154 of polarization beamsplitter 10 at nominally normal incidence as a substantially s-polarized ray 114. At least a portion of any residual p-polarization component remaining as a part of the reflected ray 112 is reflected by the polarization beamsplitter 44 through the input side 150 and is thus excluded from the substantially s-polarized ray 114.

The transmitted ray 116 continues to propagate in its original direction through the triangular prism 26 into an encounter with the polarizing beamsplitter 40 through an opposite incidence angle of approximately 45 degrees. Unlike the polarizing beamsplitter 46, but like the beamsplitter 44, the polarizing beamsplitter 40 can be termed a p-polarization reflector that primarily reflects the p-polarization component and primarily transmits the s-polarization component. The transmitted ray 116, which composed primarily of a p-polarization component, largely reflects from the polarizing beamsplitter 40 and exits through an output side 152 of polarization beamsplitter 10 at nominally normal incidence as a substantially p-polarized ray 118. At least a portion of any residual s-polarization component remaining as a part of the transmitted ray 116 is transmitted through the polarization beamsplitter 40 and out a back side 156 of polarization beamsplitter 10 and is thus excluded from the substantially p-polarized ray 118.

The unpolarized input ray 130 is treated in a similar fashion as the unpolarized input ray 110 but its polarization separation takes place in a reverse order. The input ray 130 enters the triangular prism 24 and encounters the polarizing beamsplitter 44 as a p-polarization reflector through an incidence angle of approximately 45 degrees at which the input ray 130 is split into a reflected ray 132 composed primarily of a p-polarization component and a transmitted ray 136 composed primarily of an s-polarization component.

The reflected ray 132 propagates in direction normal to the input beam across the triangular prism 24 in a direction opposite to the reflected ray 112 into an encounter with the polarizing beamsplitter 46 through a similar incidence angle of approximately 45 degrees. Unlike the polarizing beamsplitter 44, the polarizing beamsplitter 46 as an s-polarization reflector largely transmits the reflected ray 132 through both the polarizing beamsplitter 46 and the output side 152 at nominally normal incidence as a substantially p-polarized ray 134. At least a portion of any residual s-polarization component remaining as a part of the reflected ray 132 is reflected by the polarization beamsplitter 46 through the input side 150 and is thus excluded from the substantially p-polarized ray 134.

The transmitted ray 136 continues to propagate in its original direction through the triangular prism 22 into an encounter with the polarizing beamsplitter 42 through an opposite incidence angle of approximately 45 degrees. Unlike the polarizing beamsplitter 44, but like the beamsplitter 46, the polarizing beamsplitter 42 can be termed an s-polarization reflector that primarily reflects the s-polarization component and primarily transmits the p-polarization component. The transmitted ray 136, which composed primarily of an s-polarization component, largely reflects from the polarizing beamsplitter 42 and exits through the output side 154 at nominally normal incidence as a substantially s-polarized ray 138. At least a portion of any residual p-polarization component remaining as a part of the transmitted ray 136 is transmitted through the polarization beamsplitter 42 and out the back side 156 of polarization beamsplitter 10 and is thus excluded from the substantially s-polarized ray 138.

The s-polarized rays 114 and 138 are representative of an s-polarized output beam, and the p-polarized rays 118 and 134 are representative of a p-polarized output beam. Based on the symmetries exhibited by the polarization beamsplitter 10 the optical path lengths through the polarization beamsplitter 10 beginning with the input rays 110 and 130 and respectively resulting in the two s-polarized output rays 114 and 138 along a so-called s-polarization channel are substantially equal and can be precisely controlled to the desired level of accuracy. Similarly, the optical path lengths through the polarization beamsplitter 10 beginning with the input rays 110 and 130 and respectively resulting in the two p-polarized output rays 118 and 134 along a so-called p-polarization channel are substantially equal. In addition, the optical paths resulting in the two s-polarized output rays 114 and 138 along the s-polarization channel and the two p-polarized output rays 118 and 134 along the p-polarization channel are substantially equal. In addition, the two s-polarized output rays 114 and 138 and the two p-polarized output rays 118 and 134 are relatively oriented through a substantially supplementary angle for being output from the polarization beamsplitter 10 in opposite directions. In this regard, the output sides 152 and 154 are preferably oriented in parallel with each other and normal to the input side 150 of the polarization beamsplitter 10. However, for these same purposes, the shape and orientation of the back side 156 can be less important. Exiting through the back side 156 are residual polarization components that have been filtered from the transmitted beams 116 and 136 to purify the desired polarization content of the respective output rays 118 and 138. The rays exiting through the back side 156 can be subject to monitoring or some other constructive purpose or simply discarded. Similarly, top and bottom sides of the polarization beamsplitter 10, which do not participate in the transmission or reflection of polarization components of the unpolarized input beam, can vary in shape or orientation in accordance with other purposes, including the accurate mounting or assembly of the polarization beamsplitter 10.

Regardless of the pathways through the polarization beamsplitter 10 for being output as the two s-polarized output rays 114 and 138 and the two p-polarized output rays 118 and 134, the original s-polarization and p-polarizations components of the unpolarized input rays 110 and 130 each encounter both a polarizing beamsplitter as a s-polarization reflector and a polarizing beamsplitter as a p-polarization reflector. Thus, to reach the desired output rays 114, 138 and 118, 134, the original s-polarization and p-polarizations components are each reflected once by one of the polarizing beamsplitters and transmitted once by another of the polarizing beamsplitters for twice filtering the orthogonal components with different beam splitting mechanisms. The two beamsplitters 40 and 44 arranged as p-polarization reflectors are aligned located along interfaces forming one diagonal of the polarization beamsplitter 10, and the two beamsplitters 42 and 46 arranged as s-polarization reflectors are aligned located along interfaces forming another diagonal of the polarization beamsplitter 10. In these orientations, the single reflections of the original s-polarization and p-polarizations components direct the orthogonally polarized output rays 114, 138 and 118, 134 in opposite directions.

FIGS. 3A-3D show each of the triangular prisms 20, 22, 24, and 26 in a common perspective orientation. The two exposed faces 80, 82 of the prism 20, the two exposed faces 84, 86 of the prism 22, the two exposed faces 88, 90 of the prism 24, and the two exposed faces 92, 94 of the prism 26 all contribute to forming interfaces within the polarization beamsplitter 10. The polarizing beamsplitter 40 is formed on the exposed face 80 of the prism 20 within a common interface formed with the exposed face 94 of the prism 26. The polarizing beamsplitter 42 is formed on the exposed face 84 of the prism 22 within a common interface formed with the exposed face 82 of the prism 20. The polarizing beamsplitter 44 is formed on the exposed face 88 of the prism 24 within a common interface formed with the exposed face 86 of the prism 22. The polarizing beamsplitter 46 is formed on the exposed face 92 of the prism 26 within a common interface formed with the exposed face 90 of the prism 24.

The two exposed faces 80, 82 of the prism 20 are relatively oriented through an angle 60, the two exposed faces 84, 86 of the prism 22 are relatively oriented through an angle 62, the two exposed faces 88, 90 of the prism 24 are relatively oriented through an angle 64, and the two exposed faces 92, 94 of the prism 26 are relatively oriented through an angle 66. The angles 60, 62, 64, and 66 preferably sum to 360 degrees and for purposes of symmetry, each of the angles 60, 62, 64, and 66 is 90 degrees. Other combinations of angles that sum to 360 degrees are also possible for particular purposes including a need to orient the polarizing beamsplitters 40, 42, 44, and 46 for different angles of incidence.

The back faces of the triangular prisms 20, 22, 24, and 26, which are not in view within FIGS. 3A-3D, form the four sides of the polarization beamsplitter 10. For example, the back face of the prism 24 forms the input side 150, the back face of the prism 26 forms the output side 152, the back face of the prism 22 forms the output side 154, and the back face of the prism 20 forms the back side 156. The top and bottom faces of the triangular prisms contribute to forming the top and bottom of the polarization beamsplitter 10

Figure 4:
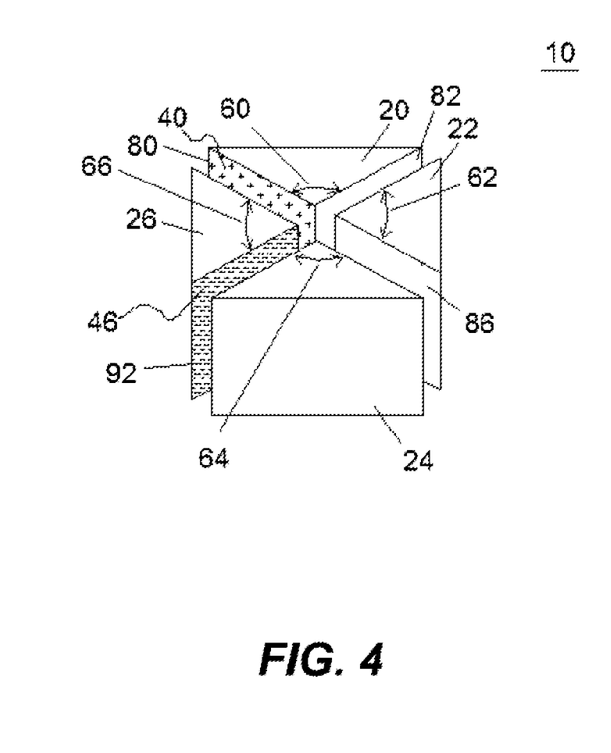
FIG. 4 is a perspective exploded view of the four triangular prisms in their relative orientations for assembling the hexagonal polarization beamsplitter of FIG. 1.
Figure 5A:
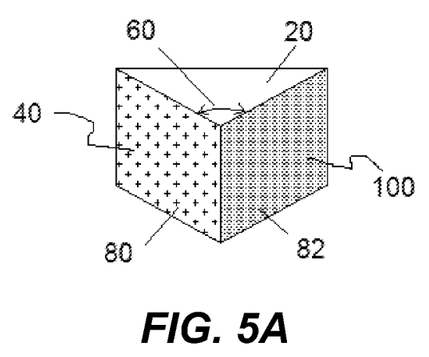
FIGS. 5A-5D are perspective views similar to the views of FIGS. 3A-3D with polarizing beamsplitters located on two faces of two of the four triangular prisms as an alternative way of locating the polarizing beamsplitters at the same interfaces between the four triangular prisms of the hexagonal polarization beamsplitter.
Figure 5B:
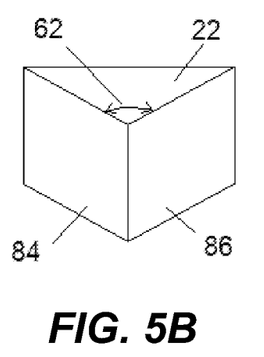
Figure 5C:
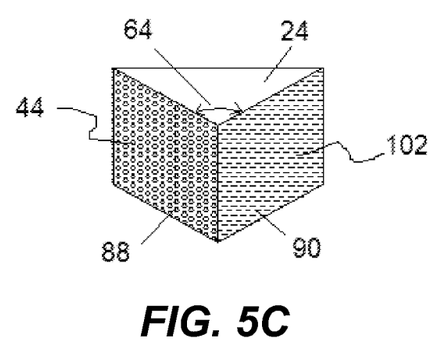
Figure 5D:
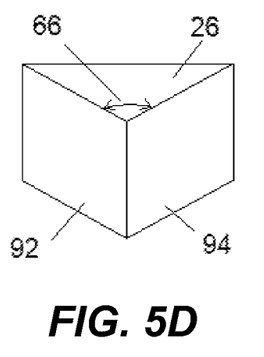

FIG. 4 shows an exploded view of the polarization beamsplitter 10 comprising the four triangular prisms 20, 22, 24, and 26 in their desired relative orientations. Although only the faces 80 and 82 of the prism 20, the face 86 of the prism 22, and the face 92 of the prism 26 and just two of the polarizing beamsplitters 40 and 46 are shown, the construction of FIG. 3 in which each of the prisms 20, 22, 24, and 26 supports one of the polarizing beamsplitters 40, 42, 44, and 46 is more readily apparent. In FIG. 4, the polarizing beamsplitter 42 is not visible but can be understood to be supported on the prism 22 adjacent to the face 82 of the prism 20. Similarly, the prism 44 is not visible but can be understood to be supported on the prism 24 adjacent to the face 86 of the prism 22. FIGS. 5A-5D, a perspective view of four triangular prisms are shown in accordance with another exemplary embodiment. Common features with the polarization beamsplitter 10 are indicated by the same reference signs, including the four triangular prisms 20, 22, 24, and 26 along with their respective exposed faces 80 and 82, 84 and 86, 88 and 90, and 92 and 94 forming the interfaces between the triangular prisms 20, 22, 24, and 26. Similar to the illustrations of FIGS. 3A-3D and 4, the polarizing beamsplitter 40 is formed or otherwise located on the face 80 of prism 20, and the polarizing beamsplitter 44 is formed or otherwise located on the face 88 of prism 24. However, instead of forming or otherwise locating two other polarizing beamsplitters on respective faces of the remaining two prisms 22 and 26, a third polarizing beamsplitter 100 is formed or otherwise located on the face 82 of the prism 20, and a fourth polarizing beamsplitter 102 is formed or otherwise located on the face 90 of the prism 24. Although the polarizing beamsplitters 40, 100, 44, and 102 are located on the faces of prisms 20 and 24, a similar set of four polarizing beamsplitters could be located on the faces of prisms 22 and 26. In a embodiment, the polarizing beamsplitters 40 and 44, which are formed along one diagonal of the polarization beamsplitter, are arranged to primarily reflect an orthogonal polarization component, and the polarizing beamsplitters 100 and 102, which are formed along another diagonal of the polarization beamsplitter, are arranged to primarily reflect another orthogonal polarization component for outputting orthogonally polarized beams in opposite directions.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A hexahedral polarization beamsplitter, comprising:
   four substantially triangular prisms at least generally forming a hexahedron assembly;
   two surfaces of each triangular prism forming interfaces with respective surfaces of two other triangular prisms forming a plurality of interfaces; and
   a polarizing beamsplitter located within each of the plurality of interfaces;
   wherein the hexahedron assembly includes an input side operable to receive an unpolarized beam, and two opposing output sides through which orthogonally polarized portions of the unpolarized beam respectively exit the hexahedron assembly;

wherein the polarizing beamsplitters are arranged at the plurality of interfaces, whereby each of the orthogonally polarized portions of the unpolarized beam is both reflected by one of the polarizing beamsplitters and transmitted by another of the polarizing beamsplitters, and wherein at least one of the polarizing beamsplitters is a thin film polarizing beamsplitter and at least one of the polarizing beamsplitters is a wire grid polarizing beamsplitter.

2. The polarization beamsplitter of claim 1 in which the orthogonally polarized portions of the unpolarized beam are distinguished as a s-polarization component and a p-polarization component, and the polarizing beamsplitters include s-polarization reflectors that primarily reflect the s-polarization component and primarily transmit the p-polarization component and p-polarization reflectors that primarily reflect the p-polarization component and primarily transmit the s-polarization component.

3. The polarization beamsplitter of claim 2, wherein at least one of the p-polarization reflectors is a wire grid polarizing beamsplitter.

4. The polarization beamsplitter of claim 3, wherein at least one of the s-polarization reflectors is a thin film polarizing beamsplitter.

5. The polarization beamsplitter of claim 1, wherein the polarizing beamsplitters are arranged so that the s-polarization component encounters both the s-polarization reflectors and the p-polarization reflectors en route between the input side and one of the opposing output sides of the hexahedron assembly, and the p-polarization component encounters both the s-polarization reflectors and the p-polarization reflectors en route between the input side and the other of the opposing output sides of the hexahedron assembly.

6. The polarization beamsplitter of claim 5, wherein (a) a s-polarization channel is defined by a beam path from the input side to the one opposing output side of the hexahedron assembly traversed by the s-polarization component resulting in an essentially s-polarized beam exiting from the one opposing output side of the hexahedron assembly, (b) a p-polarization channel is defined by a beam path from the input side to the other opposing output side of the hexahedron assembly traversed by the p-polarization component resulting in an essentially p-polarized beam exiting from the other opposing output side of the hexahedron assembly, and (c) the s-polarization channel and the p-polarization channel have equivalent optical path lengths.

7. The polarization beamsplitter of claim 6, wherein the essentially s-polarized beam and the essentially p-polarized beam exiting the hexahedron assembly are relatively oriented through a straight angle.

8. The polarization beamsplitter of claim 1, wherein each of the substantially triangular prisms includes two triangular faces and two quadrilateral faces that intersect in pairs along parallel lines that extend to corresponding vertices of the triangular faces, and the two quadrilateral faces of each triangular prism correspond to the two faces of each triangular prism that form the interfaces.

9. The polarization beamsplitter of claim 8, wherein at least three of the substantially triangular prisms include a third quadrilateral face with the third quadrilateral face of a first of the three triangular prisms forming the input side of the hexahedron assembly, and the third quadrilateral faces of a second and a third of the three triangular prisms forming the two opposing output sides of the hexahedron assembly.

10. The polarization beamsplitter of claim 9, wherein the two opposing output faces of the hexahedron are arranged in parallel.

11. The polarization beamsplitter of claim 9, wherein a fourth of the substantially triangular prisms includes a face having a general form through which a remaining unpolarized portion of the unpolarized beam exits the hexahedron assembly.

* * * * *